(12) United States Patent
Palacz et al.

(10) Patent No.: US 7,849,451 B2
(45) Date of Patent: Dec. 7, 2010

(54) DYNAMIC DELEGATION CHAIN FOR RUNTIME ADAPTATION OF A CODE UNIT TO AN ENVIRONMENT

(75) Inventors: Krzysztof Palacz, San Francisco, CA (US); Grzegorz J. Czajkowski, Mountain View, CA (US); Laurent P. Daynès, Saint-Ismier (FR)

(73) Assignee: Oracle America Inc., Redwood City, CA (US)

( * ) Notice: Subject to any disclaimer, the term of this patent is extended or adjusted under 35 U.S.C. 154(b) by 1126 days.

(21) Appl. No.: 11/366,333

(22) Filed: Mar. 2, 2006

(65) Prior Publication Data

US 2007/0234322 A1    Oct. 4, 2007

(51) Int. Cl.
 *G06F 9/45* (2006.01)
 *G06F 9/44* (2006.01)
(52) U.S. Cl. .................. 717/148; 717/162; 717/165
(58) Field of Classification Search .......... 717/130, 717/158–159
 See application file for complete search history.

(56) References Cited

U.S. PATENT DOCUMENTS

| | | | | |
|---|---|---|---|---|
| 5,864,862 A | * | 1/1999 | Kriens et al. | 707/103 R |
| 6,192,476 B1 | * | 2/2001 | Gong | 726/4 |
| 6,317,868 B1 | * | 11/2001 | Grimm et al. | 717/127 |
| 6,973,646 B1 | * | 12/2005 | Bordawekar et al. | 717/146 |
| 2004/0060041 A1 | * | 3/2004 | Demsey et al. | 717/151 |

OTHER PUBLICATIONS

"Practical delegation for secure distributed object environments" by Nagaratnam et al., Distributed Systems Engineering, 1998, p. 168-178.*
"dRBAC: Distributed Role-based Access Control for Dynamic Coalition Environments", by Freudenthal et al. International Conference on Distributed Computing, 2002, 10 pages.*
"Optimal Dispersal of Certificate Chains", by Jung et al., IEEE Transactions on Parallel and Distributed Systems, vol. 18, No. 4, Apr. 2007, 11 pages.*
Aridor, Yariv, et al., "cJVM: A Single System Image of a JVM on a Cluster," in International Conference on Parallel Processing, pp. 4-11, 1999.
Bal, Heri E., et al., "Orca: A Languange for Parallel Programming of Distributed Systems," IEEE Transactions on Software Engineering, vol. 18, No. 3, pp. 190-205, Mar. 1992.
Ban, B., "Design and Implementation of a Reliable Group Communication Toolkit for Java," Technical report, Cornell University, pp. 1-14, Sep. 1998, retrieved from URL: http://www.cs.cornell.edu/home/bba/resume.html.

(Continued)

*Primary Examiner*—Hyung S Sough
*Assistant Examiner*—Carina Yun
(74) *Attorney, Agent, or Firm*—Osha • Liang LLP (57) ABSTRACT

A dynamic delegation chain of executor objects can, at runtime, adapt code units to be executed as isolated computations prior to their execution to comport with current state of an environment. A dynamic delegation chain performs the dynamic runtime adaptation of the code unit in accordance with isolated computations that host the executor objects of the delegation chain. Adapting a code unit prior to execution of the code unit allows adaptation of the code unit to a current state, as well as at least reducing concerns of program integrity.

16 Claims, 4 Drawing Sheets

OTHER PUBLICATIONS

Balfanz, Dirk and Gong, Li, "Experience with Secure Multi-Processing in Java," in Proceedings of the 18th IEEE International Conference on Distributed Computing Systems (ICDCS'98), p. 398 (8 pages), May 1998, Amsterdam, The Netherlands.

Bershad, Brian N., et al., "Extensibility, Safety and Performance in the SPIN Operating System," in Proceedings of the 15th ACM Symposium on Operating Systems Principles (SOSP '95), ACM Press, pp. 267-284, Dec. 1995, Copper Mountain, CO.

Bryce, Ciarán, and Vitek, Jan, "The JavaSeal Mobile Agent Kernel," in First International Symposium on Agent Systems and Applications and Proceedings of the 3rd International Symposium on Mobile Agents, pp. 103-116, Oct. 3-6, 1999, Palm Springs, CA.

Cardelli, Luca, "Distributed mobile computation in Obliq," pp. 1-49, Talk given Mar. 17, 2003.

Caromel, Denis, et al., "Towards seamless computing and metacomputing in Java," Concurrency Practice and Experience, Geoffrey C. Fox, Ed., Wiley & Sons, Ltd., vol. 10, Nos. 11-13, pp. 1043-1061, Sep.-Nov. 1998, retrieved from URL: http://www-sop.inria.fr/sloop/javall/.

Cheng, Li-Te, et al., "Weaving a Social Fabric into Existing Software," in Proceedings of the 4th International Conference on Aspect-Oriented Software Development, Chicago, Illinois, AOSD '05, ACM Press,Chicago, IL, pp. 147-158, Mar. 14-18, 2005.

Czajkowski, Gregorz, et al., "A Resource Management Interface for the Java™ Platform," SML Technical Report Series, SMLI TR-2003-124, Sun Microsystems, Inc., pp. 1-17, May 2003, retrieved from URL: http://research.sun.com/techrep/2003/smli_tr-2003-124.pdf.

Czajkowski, Gregorz, "Application Isolation in the Java™ Virtual Machine," in Proceedings of the 15th ACM SIGPLAN Conference on Object-Oriented Programming, Systems, Languages, and Applications, Minneapolis, Minnesota, OOPSLA '00, ACM Press, New York, NY, pp. 354-366, Oct. 2000.

Czajkowski, G. and Daynes, L., "Multitasking without Compromise: a Virtual Machine Evolution," in Proceedings of the 16th Conference on Object-Oriented Programming, Systems, Languages, and Applications (OOPSLA-01), ACM Press, New York, NY, pp. 125-138, Oct. 2001, Tampa, FL.

Czajkowski, Gregorz, "JRes: A Resource Accounting Interface for Java," in Proceedings of the 13th ACM SIGPLAN Conference on Object-oriented Programming, Aystems, Languages, and Applications, ACM Press, New York, NY, pp. 21-35, Oct. 18-22, 1998, Vancouver, Canada.

Dillinberger, D., et al., "Building a Java Virtual Machine for Server Applications: The Jvm on OS/390," Java Performance, IBM Systems Journal, vol. 39, No. 1, pp. 194-210, Nov. 1, 2000.

Downing, T., Java RMI, IDG Books, 1998.

Engel, Michael and Freisleben, Bernd, "Supporting Autonomic Computing Functionality via Dynamic Operating System Kernel Aspects," in Proceedings of the 4th International Conference on Aspect-Oriented Software Development, AOSD '05, ACM Press, New York, NY, pp. 51-62, Mar. 14-18, 2005, Chicago, Illinois.

Factor Michael, et al., "A Distributed Runtime for Java: Yesterday and Today," in Proceedings of 18th International Parallel and Distributed Processing Symposium (IPDPS'04) Workshop 5, p. 159a, 7 pages, 2004.

Ford, Bryan and Susarla, Sai, "CPU Inheritance Scheduling," in Proceedings of the 2nd USENIX Symposium on Operating Systems Design and Implementation, ACM Press, New York, NY, pp. 91-105, 1996, Seattle, WA.

Gilani, Wasif and Spinczyk, Olaf, "A Family of Aspect Dynamic Weavers," in Proceedings of the 2004 Dynamic Aspects Workshop (DAW04), RIACS Technical Report 04.01, pp. 64-88, Mar. 2004, Lancaster, England, retrieved from URL: http://aosd.net/2004/workshops/daw/Proc-2004-Dynamic-Aspects.pdf.

Gong, Li, "Java Security: Present and Near Future," IEEE Micro, pp. 14-19, May/Jun. 1997.

Gong, Li and Schemers, Roland, "Implementing Protection Domains in the Java™ Development Kit 1.2" in Proceedings of the Internet Society Symposium on Network and Distributed System Security (NDSS'98), pp. 1-10, Mar. 11-13, 1988, San Diego, CA, retrieved from URL: http://www.isoc.org/isoc/conferences/ndss/98/gong.pdf.

Greenwood, Philip and Blair, Lynne, "Using Dynamic Aspect-Oriented Programming to Implement an Autonomic System," in Proceedings of the 2004 Dynamic Aspects Workshop (DAW04), RIACS Technical Report 04.01, pp. 76-88, Mar. 2004, Lancaster, England, retrieved from URL: http://aosd.net/2004/workshops/daw/Proc-2004-Dynamic-Aspects.pdf.

Hanenberg, Stefan, et al., "Morphing Aspects: Incompletely Woven Aspects and Continuous Weaving," in Proceedings of the 3rd International Conference on Aspect-Oriented Software Development, AOSD'04, ACM Press, New York, NY, pp. 46-55, Mar. 22-24, 2004, Lancaster, UK.

Hawblitzel, Chris, et al., "Implementing Multiple Protection Domains in Java," in Proceedings of the USENIX Annual Technical Conference (NO'98), pp. 259-270, 1998, New Orleans, LA, retrieved from URL: <http://www.usenix.org/publications/library/proceedings/usenix98/full_papers/hawblitzel.pdf>.

Java Grande Consortium, 2 pages, 2001-2003, retrieved from URL: http://www.javagrande.org.

JBossCache, 1 page, 2002-2006, retrieved from http://www.jboss.org/products/jbosscache.

Jul, Eric, et al., "Fine-Grained Mobility in the Emerald System," ACM Transactions on Computer Systems, ACM Press, vol. 6, No. 1, pp. 109-133, Feb. 1988.

Keleher, Peter J., et al., "TreadMarks: Distributed shared memory on standard workstations and operating systems," in Proceedings of the USENIX Winter 1994 Technical Conference, USENIX Association, Berkeley CA, pp. 115-132, Jan. 17-21, 1994, San Francisco, CA, , retrieved from URL: http://www.usenix.org/publications/library/proceedings/sf94/full_papers/keleher.a.

Kiczales, Gregor, et al., "Aspect-Oriented Programming," in Proceedings of the 11th European Conference on Object-Oriented Programming (ECOOP'97), (LNCS 1241), pp. 220-242, Jun. 1997, Jyväskylä, Finnland.

Levy, H., ed., Capability Based Computer Systems: Ch. 1, pp. 13-15, "The Object-Based Approach"; Ch. 4, pp. 73-75, "Operating System Resource Management," and "Input and Output"; Ch. 5, pp. 87-89, "Subprocess Creation"; Chap. 6, pp. 116-121, "Hydra Object Storage System," and "Capability Representation"; Ch. 7, pp. 130-134, "StarOS Capabilities," "Object Addressing," and "StarOS Abstract Type Management"; Ch. 8, pp. 137-157, The IBM System; Ch. 9, pp. 159-186, The Intel iAPX; Ch. 10, pp. 189-196, Storage of Capabilities, "Capability Representation,", Jan. 1984.

Luján, Mikel, et al., "DiFoJo: a Java Fork/Join Framework for Heterogeneous Networks," in Proceedings of the 13th Euromicro Conference on Parallel, Distributed and Network-Based Processing (Euromicro-PDP'05), IEEE Computer Society, pp. 297-304, Feb. 2005, Lugano, Switzerland.

Palacz, Krzysztof, Java Community Process, "JSR 121: Application Isolation API Specification," retrieved from URL: http://web2.jcp.org/en/jsr/detail?id=121 , 5 pages, Dec. 19, 2002.

Palacz, Krzysztof, et al., "Incommunicado: Efficient Communication for Isolates," in Proceedings of the 17th ACM SIGPLAN Conference on Object-Oriented Programming, Systems, Languages, and Applications, OOPSLA'02, ACM Press, New York, NY, pp. 262-274, Nov. 2002, Seattle, WA.

Pratikakis, Polyvios, et al., "Transparent Proxies for Java Futures," in Proceedings of the 19th Annual ACM SIGPLAN Conference on Object-Oriented Programming, Systems, Languages, and Applications (OOPSLA'04), pp. 206-223, Oct. 24-28, 2004, Vancouver, British Columbia, CA.

Schmidt, Douglas C., "Using Design Patterns to Develop Reusable Object-Oriented Communication Software," Communications of the ACM, vol. 38, No. 10, pp. 65-74, Oct. 1995.

Sunderam, V. S., PVM: A Framework for Parallel Distributed Computing, Concurrency: Practice and Experience, vol. 2, No. 4, pp. 315-339, Dec. 1990, retrieved from URL: http://citeseer.ist.psu.edu/rd/7703322, 18858,1,0.25, Download/http://citeseer.ist.psu.edu/compress/0/papers/cs/5283/http:zSzzSzwww.hensa.ac.ukzSzparallelzSzenvironmentszSzpvm3zSzemory-vsszSzpvmsystem.ps.gz/sunderam90pvm.ps.

Suri, Niranjan, et al., "An Overview of the NOMADS Mobile Agent System," in Proceedings of 14th European Conference on Object- Oriented Programming (ECOOP 2000), Jun. 12-16, Nice, France, retrieved from URL: http://citeseer.ist.psu.edu/suri00overview.html.

Tanenbaum, Andrew. S. and Van Steen, Maarten, Sections 3.4, "Code Migration," 3.5, "Software Agents," 4.2, "Locating Mobile Entities," 4.3, "Removing Unreferenced Entities," and 6.4, "Distribution Protocols," 64 pages, Distributed Systems Principals and Paradigms, Prentice Hall, Reading, MA, 2002, Jan. 2002.

Tullmann, Patrick, et al., "Janos: A Java-Oriented OS for Active Network Nodes," IEEE Journal on Selected Areas on Communications, IEEE Computer Society, vol. 19, No. 3, pp. 501-510, Mar. 2001.

Vanderperren, Wim, et al., "Adaptive Programming in JAsCo," in Proceedings of the 4th International Conference on Aspect-Oriented Software Development, AOSD '05, ACM Press, New York, NY, pp. 75-86, Mar. 14-18, 2005, Chicago, Illinois.

Vanderperren, Wim and Suvée, Davy, "Optimizing JAsCo Dynamic AOP through HotSwap and Jutta," in Proceedings of the 2004 Dynamic Aspects Workshop (DAW04), RIACS Technical Report 04.01, pp. 120-134, Mar. 2004, Lancaster, England, retrieved from URL: http://aosd.net/2004/workshops/daw/Proc-2004-Dynamic-Aspects.pdf.

Vasseur, Alexandre, "Dynamic AOP and Runtime Weaving for Java—How does AspectWerkz Address It?" in Proceedings of the 2004 Dynamic Aspects Workshop (DAW04), RIACS Technical Report 04.01, pp. 135-145, Mar. 2004, Lancaster, England, retrieved from URL: http://aosd.net/2004/workshops/daw/Proc-2004-Dynamic-Aspects.pdf.

Vitek, Olga, et al., "Model-Based Assignment and Inference of Protein Backbone Nuclear Magnetic Resonances," Statistical Applications in Genetics and Molecular Biology, vol. 3, issue 1, article 6, pp. 1-33, The Berkeley Electronic Press, 2004, retrieved from URL: http://www.cs.dartmouth.edu/~cbk/papers/sagmb04.pdf.

Wahbe, Robert, et al., "Efficient Software-Based Fault Isolation," in Proceedings of the 14th ACM Symposium on Operating Systems Principles (SOSP '93), ACM Press, New York, NY, pp. 203-216, Dec. 1993, Asheville, NC.

Wallach, Dan S., "Extensible Security Architectures for Java," in Proceedings of the 16th ACM Symposium on Operating Systems Principles, ACM Press, New York, NY, pp. 116-128, Oct. 1997, Saint Malo, France.

Yu, Weimin and Cox, Alan, "Java/DSM: A Platform for Heterogeneous Computing," Concurrency Practice and Experience, vol. 9(11), John Wiley & Sons, Ltd., pp. 1213-1224, Nov. 1997.

Zhang, Charles, et al., "Towards Just-in-time Middleware Architectures," in Proceedings of the 4th International Conference on Aspect-Oriented Software Development, AOSD '05, ACM Press, New York, NY, pp. 63-74, Mar. 14-18, 2005, Chicago, Illinois.

\* cited by examiner

DYNAMIC DELEGATION CHAIN FOR RUNTIME ADAPTATION OF A CODE UNIT TO AN ENVIRONMENT

BACKGROUND

1. Field of the Invention

The invention relates generally to dynamic adaptation of code, and, more specifically, to dynamic adaptation by a delegation chain of a code to be executed as an isolated computation.

2. Description of the Related Art

The ability to dynamically inject code into a code unit is addressed for a variety of reasons. For example, in some implementations every newly created computation subject to resource usage policies registers itself with computations dispensing resources and imposing these policies. The decision with which resource dispensing computation to register is taken at runtime. The registration sequence is independent from the application code intended to run in the computation. Typically, such registration sequences are injected before the original code unit entry point and may require deregistration sequences that should be run when the computation is being shutdown.

Current implementation techniques either hardcode the registration sequence and thus create a dependency between implementations of otherwise unrelated APIs, or require the application code to use special wrapper methods to create and start code units in order to ensure that they will be subject to the specified resource management policies.

Similarly, imposing security, management (e.g., JMX-style), logging policies, etc., on isolated computations requires injecting sequences of code into code units submitted for execution. Aspect Oriented Programming (AOP) environments, such as AspectJ, impose aspects statically, and do not support runtime selection and manipulation of aspects.

Dynamic AOP environments (JBossAOP, AspectWerkz, Prose, Nanning Aspects) concentrate on dynamically adding aspects to already executing applications, which raises concerns regarding preservation of application integrity (e.g., invocations of an advised method may be already executing when an aspect is applied, a persistence aspect may be introduced in the middle of a transaction, etc). The existing Dynamic AOP environments provide the means of weaving (and a unweaving) a single aspect at a time and are not concerned with how aspects are composed, and do not attempt to reflect the fact that different parts of an application have varying degrees of competence or privilege to apply aspects. Although these environments provide operations that can be repeated to unweave multiple aspects, these environments do not track such operations in a manner that can be programmatically explored. Furthermore, the 'dynamic' character of these environments is limited. The dynamic AOP environments lack a structural mechanism for making runtime decisions for unweaving aspects. No mechanism is provided to undo aspect weaving, when it is discovered that already applied aspects are not composable.

SUMMARY

It has been discovered that a code unit to be executed as an isolated computation can be dynamically adapted by a delegation chain prior to execution of the code unit based, at least in part, on runtime information. Each member of the delegation chain has the capability to adapt, submit, and reject the code unit in accordance with current state of an environment and in accordance with a corresponding isolated computation that implements an aspect of the environment. Hence, the code unit conforms to current state of an environment without concerns of application integrity. Each member of the delegation chain has the capability to adapt, submit, and reject the code unit in accordance with current state of the environment.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE EMBODIMENT(S)

The description that follows includes exemplary systems, methods, techniques, instruction sequences and computer program products that embody techniques of the present invention. However, it is understood that the described invention may be practiced without these specific details. For instance, reference is made to the Java platform and JVM virtual machines. Although other runtime environments, platforms, runtime environments, etc., can be utilized to implement embodiments, the specific references are made to aid in understanding the examples. In other instances, well-known protocols, structures and techniques have not been shown in detail in order not to obscure the invention.

The following description enlists the terms "executor object," "delegation chain," "computation," and "isolated computation" to aid in understanding illustrations herein. The term executor object refers to a runtime instantiation of an executor as defined by a class, interface, etc. An executor object is responsible for either executing a unit of code or delegating such responsibility to another executor object. The term delegation chain refers to plural executor objects that serially delegate execution of a code unit. A computation is one or more executing pieces of code that cause one or more tasks to be performed. Computations include entities that occupy an address space in system memory (e.g., processes, threads, applications, etc.). An isolated computation is a computation that does not share state, objects, or data with other computations (i.e., the computations are encapsulated). For example, two isolated computations cannot exchange data with shared variables. Java Specification Request 121 entitled "Application Isolation API Specification" provides an exemplary guideline for implementation of an isolated computation. Isolate creation and life cycle management are the subject of the Application Isolation API ("Isolate API"), the formal output of JSR-121. The isolate API is fully compatible with existing applications and middleware. In particular, applications that pre-date JSR121 may be managed by the API without modification.

Executor Objects

Executor objects collaborating on execution of a target code unit form a stack. When a code unit is submitted for execution to an executor object (either directly by the application or as a result of a delegation), the executor object is pushed on that code unit's executor stack. If the executor object rejects the code unit, it is popped from the executor stack. If the stack is empty now, the code unit is marked as 'rejected' and it is up to the application to decide how to handle this case (resubmit or give up). If the stack is not empty and has another executor object at the top, a callback is invoked in the executor object at the top in order to notify it that it should handle the code unit. For example, when a target code unit A is submitted for execution to executor object E1, E1 is pushed on the executor stack of A. E1 delegates to E2. As a result, E2 is pushed on the stack which now contains (E1, E2). E2 then rejects the code unit. As a result, E1 is popped from the stack and a callback is invoked in E1 to notify it that it should handle A, because E1 is at the top of the stack now. E1 also decides to reject A, thus the stack becomes empty and the code unit is marked as 'rejected.'

A privileged system executor object can execute code units as isolated computations directly. A reference to a system executor object can be obtained through a standard API, and is subject to permission checks in order to prevent unauthorized code units from circumventing the executor delegation chain. When a target code unit is submitted to the system executor object and the system executor object initiates execution of the code unit, the executor stack of the target code unit is not needed any further and may be discarded. Thus, the system executor object can only appear at the top of executor stack and no code unit can be executed until the system executor object is pushed on the top of its executor stack.

Dynamic Delegation Chain

Figure 1:
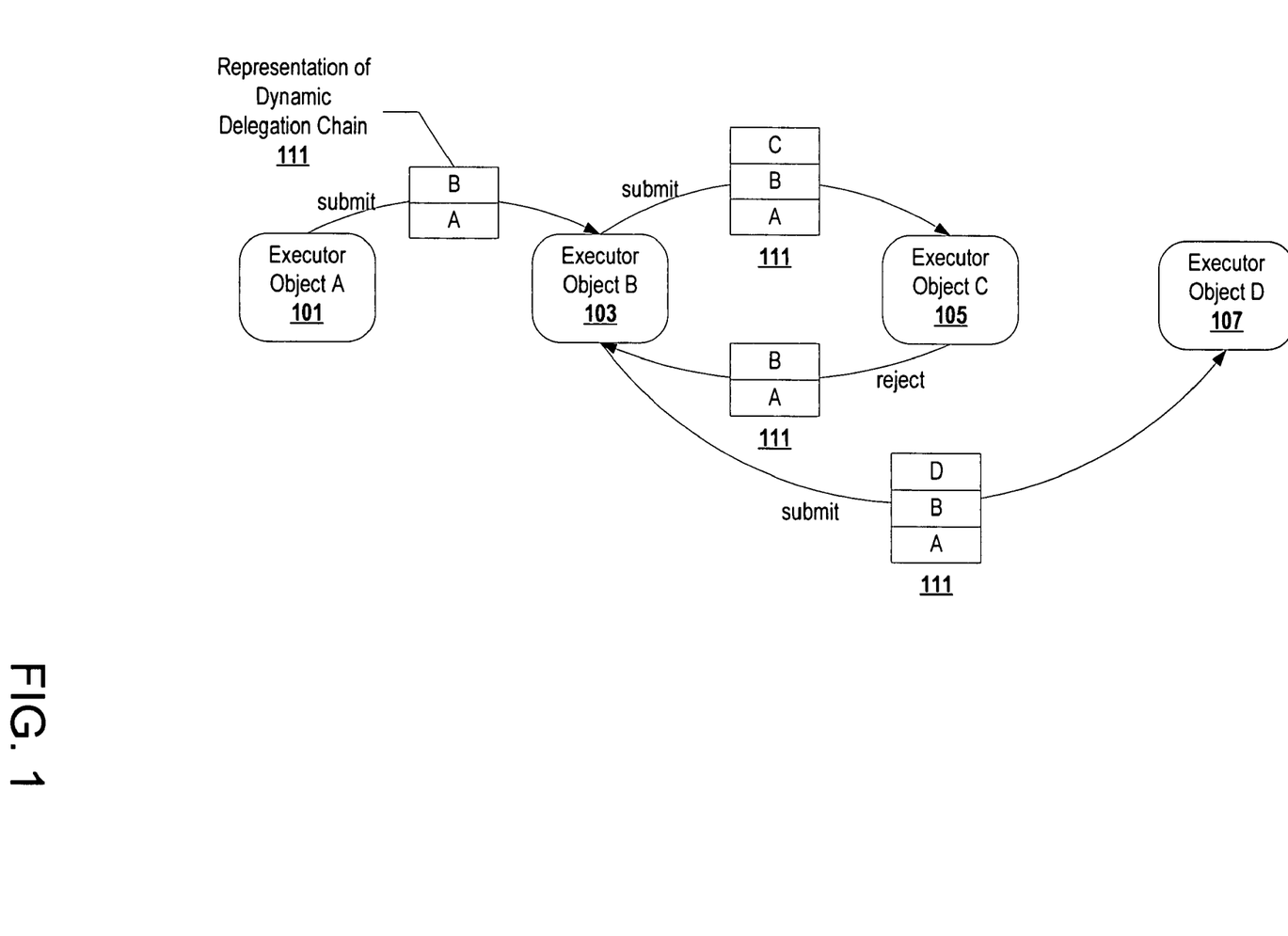
FIG. 1 depicts an example of dynamic delegation chain.

FIG. 1 depicts an example of a dynamic delegation chain. A dynamic delegation chain is a chain of executor objects assembled at runtime. A code unit is adapted by a dynamic delegation chain to conform to computations that implement one or more aspects (e.g., policies for an environment). Although the term aspect has been anchored in computer science literature to the term cross-cutting concern, the term aspect as used herein is not limited to such a narrow definition. The term aspect is used herein to refer to a feature or element of a program which may be a cross-cutting concern or a core concern. The one or more aspects may be layered upon an environment (e.g., a platform, a runtime environment, such as JVM virtual machine, etc.). Without being static, a delegation chain can dynamically adapt a code unit to a current state of an environment, and not be restricted to a stale or expected state. A dynamic delegation chain can prevent ignorantly executing a code unit without knowledge of current state of an environment.

In FIG. 1, a representation 111 of a dynamic delegation chain is illustrated. The representation 111 indicates the executor objects of the dynamic delegation chain illustrated in FIG. 1 that serially adapt a code unit, although the code unit is not illustrated. An executor object A 101 submits the code unit to an executor object B 103. At that time, the state of the representation 111 indicates B above A. Although it is not necessary for the representation 111 to be implemented as a stack, it is illustrated as a stack to aid in understanding the illustrated example. The executor object B 103 then submits the code unit to an executor object C 105. At that time, the representation 111 indicates C at the top of the representation 111 above B. The executor object C 105 rejects the code unit, and returns the code unit to the executor object B 103. As a result of the rejection, indication of the executor object C 105 is removed from the representation 111. After rejection by the executor object C 105, the executor object B 103 submits the code unit to an executor object D 107. To reflect the submission, an indication of the executor object D 107 is pushed on to the representation 111. The submission rejection interaction between executor objects reflects the dynamic path of adaptation that may be traversed by a code unit as defined by executor objects in accordance with computations that host the executor objects. Such host computations may implement policies, such as resource management policies, logging policies, security policies, etc.

The ability to reject and resubmit code units enables the development of adaptive resource usage policies. Resource usage information may become inaccurate soon after it is collected, and if a decision how to schedule a code unit is based on such outdated information, it can easily result in a failure that has to be dealt with on the application level. For instance, if an instantiated code unit requires a large amount of heap memory to run, and the decision regarding the node on which to execute this code unit is made based on an outdated snapshot of heap utilization in the cluster, the code unit may fail to start if the heap utilization on the chosen node has increased since the utilization information was collected. Such a failure will be then propagated to the application. This failure can be avoided with dynamic adaptation of a code unit prior to execution of the code unit as an isolated computation.

Although the representation 111 is illustrated as a stack structure, the representation may be implemented with any of a variety of data structures that conform to a stack discipline. In addition, the representation may be communicated among the executor objects with various techniques. For example, the representation may be instantiated at a particular location and address space, and an indication of the address space of the instantiation communicated among the executor objects. In another example, the representation may be embedded into a code unit (e.g., header of the code unit) that is passed among the executor objects. In another example, the representation 111 in FIG. 1 may simply be conceptual. Indication of one or more predecessor executor objects, subsequent executor objects, and/or alternative executor objects in an adaptation path may be coded within each of the executor objects instead of (or in addition to) maintaining an instantiated representation.

Dynamic Code Adaptation to an Environment

Isolated computations of an environment have access to a default executor object. Initially, the default executor object is the executor object to which the isolated computation was originally submitted for execution, thus it may be non-local (i.e., reside in a different isolated computation). However, the default executor object may be substituted, subject to permission checks mandated by security policies. An isolated computation may also have access to nondefault executor objects. If the default executor object is used to initiate the submission of a new isolated computation, the default executor object will appear at the bottom of the executor object stack and will remain at that position until the executor object stack is discarded or the isolated computation is rejected.

Each executor object can add hooks (sequences of code with accompanying data) to every isolated computation submitted to it. Hooks will be later run at predetermined times inside the submitted isolated computation. The following is an example of a set of hooks: StartupHook, executed on isolated computation startup (before the control is passed to the original isolated computation entry point); ShutdownHook, executed when isolated computation shutdown is requested; InvocationHook, executed before every cross-isolated computation communication attempt, and ClassLoadingHook, invoked before every class loading attempt resulting from a cross-isolated computation communication attempt. Note that hooks can raise exceptions, which abort communication attempts. In particular, if an InvocationHook or a ClassLoadingHook raises an exception, the communication attempt that triggered the hook will be aborted, and the incoming data will not be made available to application code. Other communication attempts will not be affected.

A code unit can be adapted with hooks added serially, potentially extended to handle cross isolated computation references specific to support mechanisms of communication between isolated computations. The hooks are executed in an isolated computation in FIFO order, i.e., the hooks added last will be run first. Hooks added by an executor object are removed if the executor object rejects a code unit later. The FIFO convention allows ordering of executor objects depending on their privilege or competence level, with most trusted executor objects appearing at the end of the delegation chain and the least trusted executor objects at the beginning. For instance, a security-related executor object appears last in the delegation chain to ensure that it has the "final say," preceded by, e.g., a resource management executor object, preceded by, e.g., an executor object that adds a logging adaptation.

When a code unit is submitted to an executor object, the executor object can inspect, add or modify declarative attributes associated with the code unit. These attributes are also available for inspection from inside the code unit, once its execution has started. The attributes may be used to communicate information about the details of execution of isolated computations between the application and executor objects as well as among executor objects. For instance, an application may reserve a certain amount of a resource for exclusive use for one of its isolated computations by adding a reservation attribute to the code unit for this isolated computation. One of the executor objects in the delegation chain of the code unit may recognize this attribute and create an appropriate resource domain with the specified reservation, as well as add a startup hook to the code unit, which will cause registration of the isolated computation (i.e., the executed code unit) with the newly created resource domain.

Figure 2:
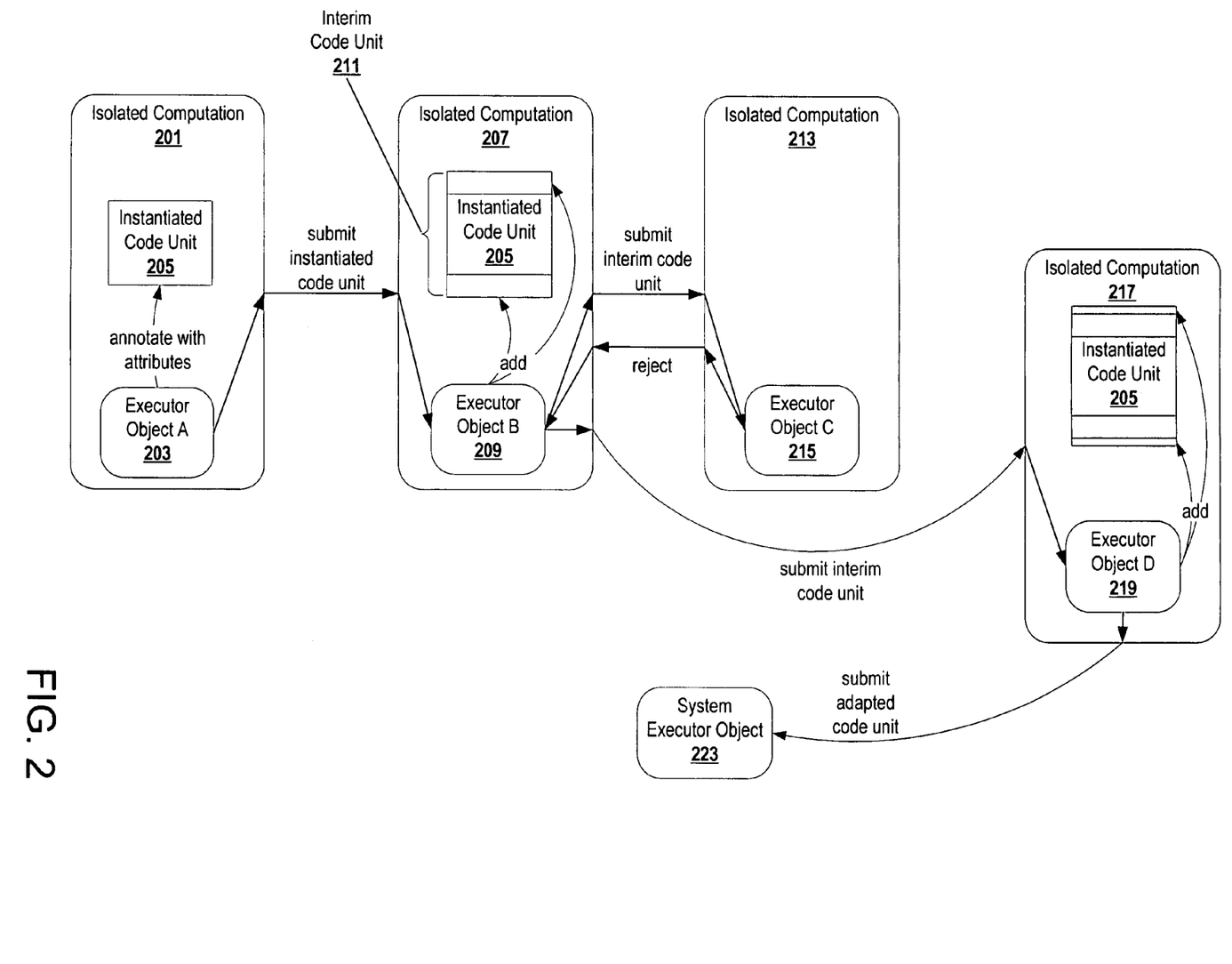
FIG. 2 depicts example adaptation of a code unit by a dynamic delegation chain.

FIG. 2 depicts example adaptation of a code unit by a dynamic delegation chain. In FIG. 2, isolated computations 201, 207, 213, and 217 are depicted. Each of the isolated computations 201, 207, 213, and 217 enforce or implement an aspect integral to/or layered upon an environment. An aspect may be a security policy, a logging policy, a resource management policy, etc. A code unit 205 is instantiated in the isolated computation 201. An executor object A 203 annotates the instantiated code unit 205 with attributes that project future resource usage. The executor object A 203 submits the instantiated code unit 205 to an executor object B 209 of the isolated computation 207. The isolated computation 207 tracks resource usage in the host environment, and causes the executor object B 209 to bind the instantiated code unit 205 to various resource domains, based on the declarative attributes of the code unit 205. Accordingly, the executor object B 209 adds code to the instantiated code unit 205 to cause the resultant isolated computation to register with the appropriate resource dispenser(s). The executor object B 209 submits interim code unit 211 (i.e., the instantiated code unit 205 with the code added by the executor object B 209) to an executor object C 215 of the isolated computation 213. The isolated computation 213 is responsible for security decisions. In accordance with the isolated computation 213, the executor object C 215 rejects the interim code unit 211. For example, the isolated computation 213 may be guarding access to a privileged group of nodes and it does not find the necessary cryptographic signature in the declarative attributes of the interim code unit 211. The executor object B 209 is notified that the executor object C 215 rejects the interim code unit 211. Subsequent to the rejection by the executor object C 215, the executor object B 209 submits the interim code unit 211 to an executor object D 219 of the isolated computation 217. The executor object D 219 adds further code (e.g., startup and shutdown hooks) to the interim code unit 211 in accordance with the isolated computation 217, which is less restrictive. The executor object D 219 then submits an adapted version of the instantiated code unit 205 (i.e., the interim code unit 211 with the code added by the executor object D 219) to a system executor object 223. Although FIG. 2 illustrates executor objects adding code to an instantiated code unit, executor objects can modify a code unit, add state and/or data to a code unit, and/or inspect the code unit instead of or in addition to adding code to a code unit.

Although FIG. 2 suggests that the code unit 205 is passed among the isolated computations, adaptation of the code unit is not limited to exchange of the code unit among isolated computations. For example, an address indication or representation for the code unit, and perhaps ownership, may be communicated among executor objects and isolated computations. In another example, the code unit itself is passed among isolated computations and executor objects, but annotations and added code are not contiguous or coextensive with the code unit in address space. Implementations may accumulate annotations and/or added code such as hooks separately from the code unit. Eventually, prior to execution of the code unit, the instantiated code unit is injected into the accumulated annotations and/or code. Another variant from the illustrated example would be a final rejection of the unit of code. FIG. 2 illustrates rejection of the unit of code and resubmission of the code unit to another executor object. However, rejection by the executor object C 215 may cause the executor object B 209 to also reject the code unit. If another executor object cannot adapt or submit the unit of code for execution (e.g., there is no other executor object in the delegation chain), then an indication of the final rejection is indicated to the isolated computation that instantiated the unit of code. In the example illustrated in FIG. 2, final rejection would be communicated by the executor object A 203 to the isolated computation 201. After final rejection by the executor object A203, the isolated computation 201 may forego execution of the code unit 205 or resubmit the instantiated code unit 205 to the executor object A203.

Rejection of the code unit may be a result of a particular state of the environment that hosts the isolated computation. In such a scenario, changes to the state of the environment (e.g., increased available resources by unconsumption, increased privilege level by isolated computation, etc.) allows one or more of the isolated computations in a dynamic delegation chain to adapt the instantiated code unit, which allows for successful execution by a system executor object.

A dynamic delegation chain may be assembled with various techniques. For example, dynamic adaptation of an instantiated code unit to conform to an aspect of an environment can also be applied to construct or assemble a dynamic delegation chain. The dynamic delegation chain can be established and modified. For example, assume the executor object D 219 of FIG. 2 adapts the code units, eventually to be executed as the executor objects C 215 and B 209, to submit code units to the executor object D 219. Prior to execution of the code unit for the executor object B 209, the executor object C 215 adapts the code unit for the executor object B 209 to submit code to the executor object C 215 and alternatively to the executor object D 219. Hence, a delegation chain can be dynamically constructed and modified with dynamic adaptation of a code unit. This adaptation of executor code can take the form of adapting code, adapting configuration data, adapting both code and configuration data, etc. A dynamic delegation chain may also be constructed through interactions between executor objects. For example, executor objects may communicate to each other to modify or assemble a dynamic delegation chain, attain runtime information for the environment to modify or assemble a dynamic delegation chain, etc. For instance, an executor X is instantiated to delegate to executor Y. During runtime, executor X then decides to delegate to executor Z, based on current state of an environment. Cognizance of other executor objects may be implemented with communication between executor objects or their isolated computations upon instantiation of an executor object, registering with an isolated computation that tracks instantiated or active executor objects and that propagates the information throughout the environment, etc. An executor may also provide an API function (e.g., delegateTo ()), callable by external code, such as glue code, to assemble or modify a delegation chain. Hence, a dynamic delegation chain can be assembled or modified with various techniques or combination of techniques, such as the example techniques described above.

Figure 3:
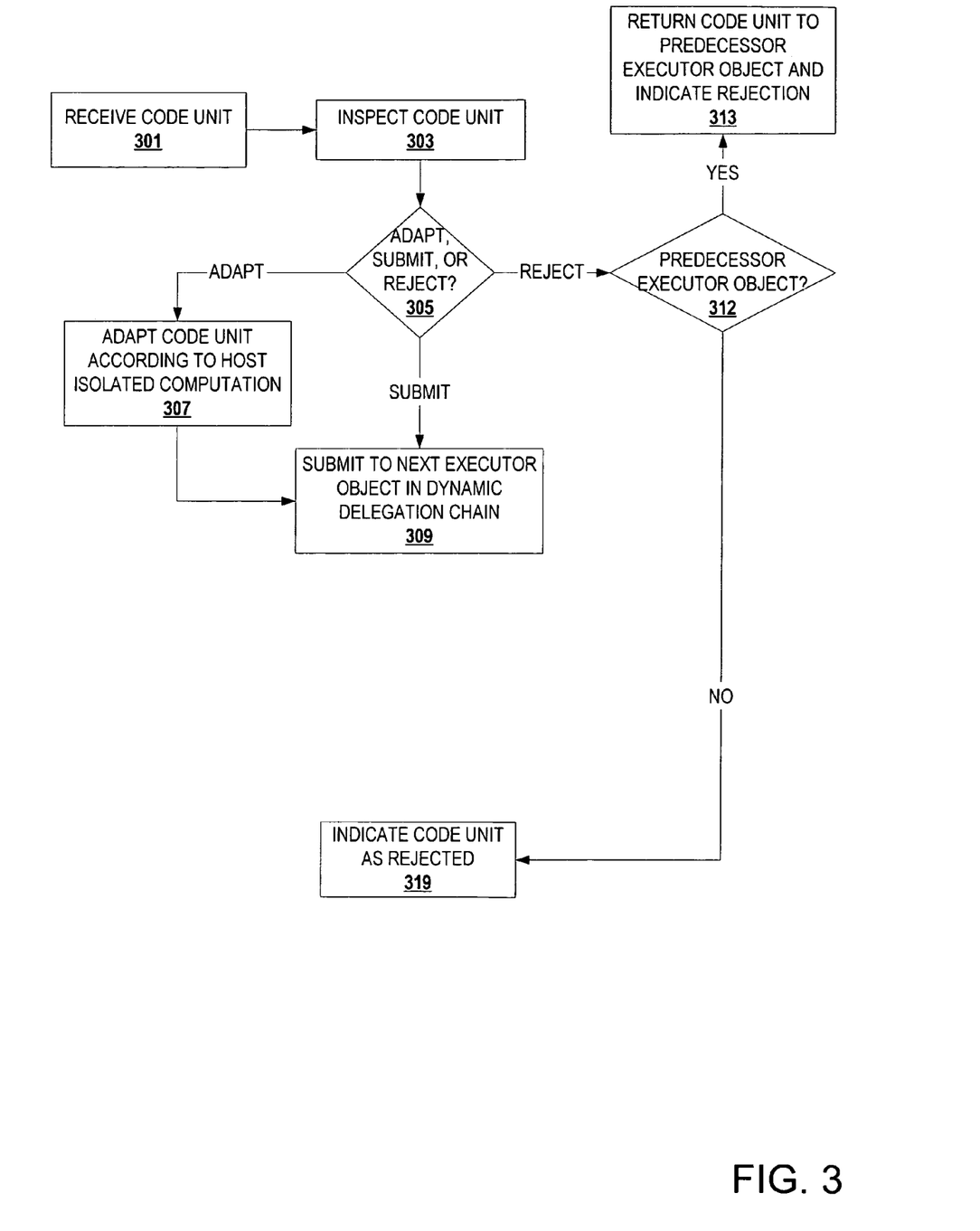
FIG. 3 depicts an example flowchart for an executor object in a dynamic delegation chain.

FIG. 3 depicts an example flowchart for an executor object in a dynamic delegation chain. At block 301, a code unit is received. The received code unit may have been submitted by an executor object, rejected by an executor object, instantiated in a computation that hosts the current executor object, etc. At block 303, the code unit is inspected. At block 305, the code unit is either adapted, submitted to another executor object or rejected. If the code unit is adapted, then control flows to block 307. If the code unit is submitted to another executor object, the control flows to block 309. If the code unit is to be rejected, then control flows to block 312.

At block 307, the code unit is adapted according to the host isolated computation of the executor object. Control flows from block 307 to block 309. At block 309, code unit is submitted to the next executor object in the dynamic delegation chain.

At block 312, it is determined if there is a predecessor executor object. If there is not a predecessor executor object, then control flows to block 319. If there is a predecessor executor object, then control flows to block 313.

At block 313, the code unit is returned to the predecessor executor object and rejection of the code unit is indicated to the predecessor executor object.

At block 319, the code unit is indicated as rejected.

The described embodiments may be provided as a computer program product, or software, that may include a machine-readable medium having stored thereon instructions, which may be used to program a computer system (or other electronic device) to perform a process according to presently described embodiments. A machine readable medium includes any mechanism for storing or transmitting information in a form (e.g., software, processing application) readable by a machine (e.g., a computer). The machine readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Figure 4:
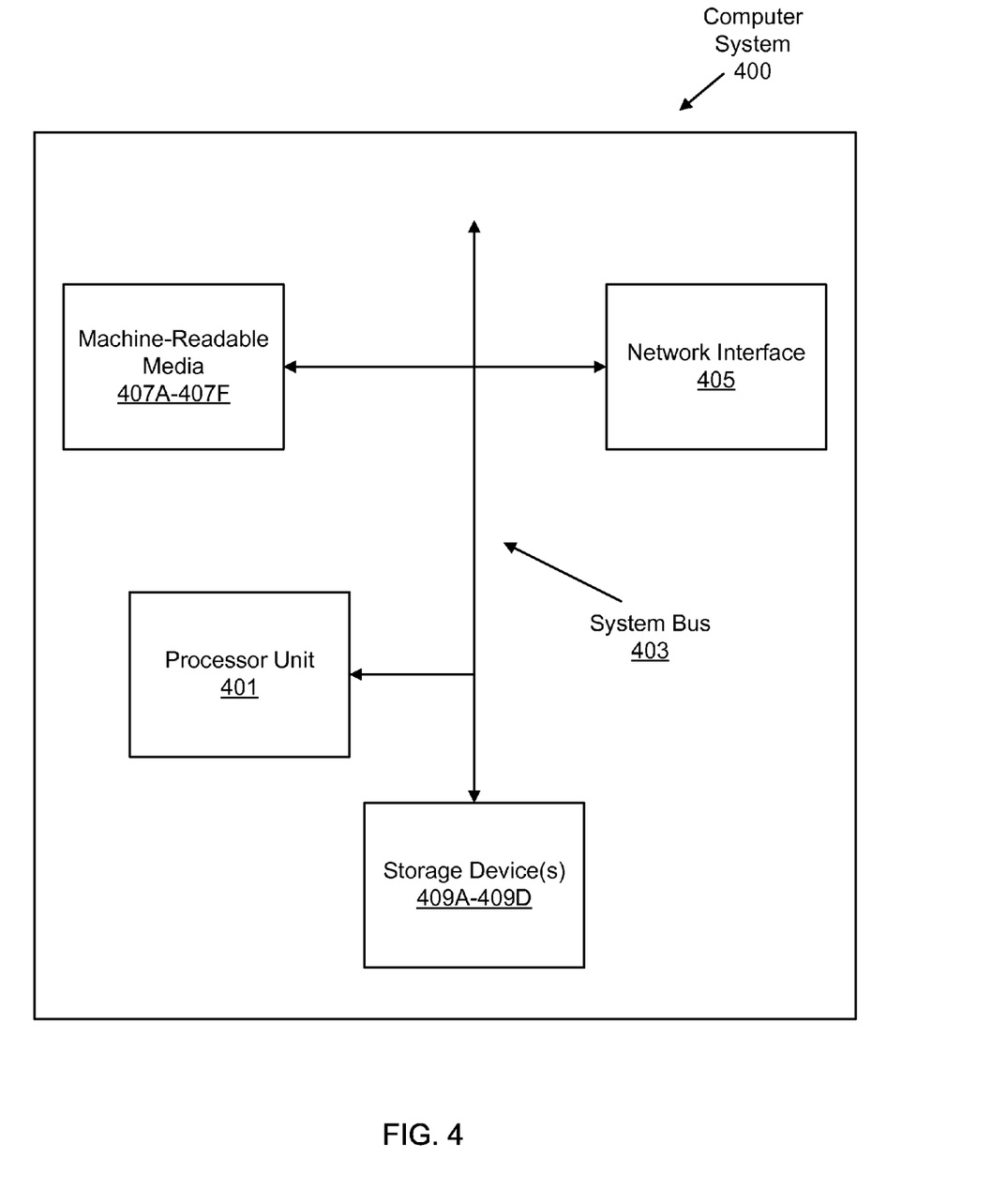
FIG. 4 depicts an exemplary computer system according to some realizations of the invention.

FIG. 4 depicts an exemplary computer system according to some realizations of the invention. A computer system 400 includes a processor unit 401 (possibly including multiple processors, multiple cores, multiple nodes, and/or implementing multi-threading). The computer system 400 includes machine-readable media 407A-407F. The machine-readable media 407A-407F may be system memory (e.g., one or more of cache, SRAM, DRAM, RDRAM, EDO RAM, DDR RAM, EEPROM, etc.) or any one or more of the above already described possible realizations of machine-readable media. The computer system 400 also includes a system bus 403 (e.g., LDT, PCI, ISA, etc.), a network interface 405 (e.g., an ATM interface, an Ethernet interface, a Frame Relay interface, etc.), and a storage device(s) 409A-409D (e.g., optical storage, magnetic storage, etc.). One or more of the machine-readable media 407A-407F embodies instructions to implement a dynamic delegation chain to dynamically adapt a code unit at runtime to an environment prior to execution of the code units as an isolated computation. The machine-readable media 409A-409D may alternatively or also embody object (e.g., interface, class, etc.) definitions for implementing a dynamic delegation chain. Realizations may include fewer or additional components not illustrated in FIG. 4 (e.g., video cards, audio cards, additional network interfaces, peripheral devices, etc.). The processor unit 401, the storage device(s) 409A-409D, and the network interface 405 are coupled to the system bus 403. The machine-readable media 407A-407F is either coupled directly or indirectly to the system bus 503. In addition, at least some of the functionality for implementing a dynamic delegation chain for dynamic runtime adaptation of a code unit(s) may also be embodied in the storage device(s) 409A-409D and/or the processor unit 401.

While the invention has been described with reference to various realizations, it will be understood that these realizations are illustrative and that the scope of the invention is not limited to them. Many variations, modifications, additions, and improvements are possible. More generally, realizations in accordance with the present invention have been described in the context of particular realizations. These realizations are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the invention as defined in the claims that follow.

What is claimed is:

1. A method comprising:
assembling a delegation chain of a plurality of executor objects for serially adapting a code unit to an environment comprising a plurality of aspects, at runtime,
wherein the plurality of executor objects are capable of rejecting the code unit based on one or more of the plurality of executor objects,
wherein the plurality of executor objects are configured to customize the code unit,
wherein the environment hosts asynchronous concurrent tasks, and
wherein assembling comprises customizing at least one of code and configuration data of a first executor object code that causes the first executor object to submit the code unit to a second executor object of the plurality of executor objects before executing the code unit;
dynamically adapting the code unit to the environment, at runtime, using the delegation chain, to serially delegate execution of the code unit, by:
submitting, by each executor object of the plurality of executor objects and based on one of the plurality of aspects implemented by each executor object, the code unit to a next executor object of the delegation chain; and executing, after dynamically adapting, the code unit as an isolated computation directly by a privileged system executor object of the plurality of executor objects when the code unit is allowed by the plurality of executor objects in accordance with a current runtime state of the environment, wherein each of the plurality of aspects refer to a feature or element of a program executing in the environment that is a cross-cutting concern or a core concern.

2. The method of claim 1, wherein the adapting comprises at least one of adding supplemental code to the code unit, adding state to the code unit, modifying code of the code unit, annotating the code unit, and modifying data of the code unit.

3. The method of claim 1, wherein the adapting comprises constructing a representation with at least one of code, state, and data.

4. The method of claim 3, wherein executing the adapted code unit comprises injecting the code unit into the constructed representation.

5. The method of claim 2, wherein the supplemental code comprises at least one of registration code, deregistration code, startup code, and shutdown code.

6. The method of claim 1, wherein the plurality of aspects comprise at least one of one or more security policies, one or more inter-isolated computation communication policies, and one or more logging policies.

7. A method comprising:
assembling a delegation chain of a plurality of executor objects for serially adapting a code unit to an environment comprising a plurality of aspects, at runtime,
  wherein the plurality of executor objects is capable of rejecting the code unit based on one or more of the plurality of executor objects,
  wherein the plurality of executor objects is configured to customize the code unit, and
  wherein the environment hosts asynchronous concurrent tasks;
dynamically adapting, after assembling, the code unit to the environment using the delegation chain to serially delegate execution of the code unit, by:
  submitting, by each executor object of the plurality of executor objects and based on one of the plurality of aspects implemented by each executor object, the code unit to a next executor object of the delegation chain; and
executing, after dynamically adapting, the code unit as an isolated computation directly by a privileged system executor object of the plurality of executor objects when the code unit is allowed by the plurality of executor objects in accordance with a current runtime state of the environment,
wherein each of the plurality of aspects refer to a feature or element of a program executing in the environment that is a cross-cutting concern or a core concern.

8. The method of claim 7, wherein an executor structure represents state of the delegation chain and the code unit.

9. The method of claim 8 further comprising:
adding an indication of a first executor object of the plurality of executor objects to the executor structure when the code unit is submitted to the first executor object;
removing the indication of the first executor object from the executor structure if the first executor object rejects the code unit; and
adding an indication of a second executor object of the plurality of executor objects to the executor structure if the code unit is submitted to the second executor object.

10. A computer program product encoded in one or more non-transitory machine-readable media, the computer program product comprising instructions to:
assemble a delegation chain of a plurality of executor objects for serially adapting a code unit to an environment comprising a plurality of aspects, at runtime,
  wherein the plurality of executor objects are capable of rejecting the code unit based on one or more of the plurality of executor objects,
  wherein the plurality of executor objects are configured to customize the code unit,
  wherein the environment hosts asynchronous concurrent tasks, and
  wherein assembling comprises customizing at least one of code and configuration data of a first executor object code that causes the first executor object to submit the code unit to a second executor object of the plurality of executor objects before executing the code unit;
dynamically adapt the code unit to the environment, at runtime, using the delegation chain, to serially delegate execution of the code unit, by:
  submitting, by each executor object of the plurality of executor objects and based on one of the plurality of aspects implemented by each executor object, the code unit to a next executor object of the delegation chain; and
execute, after dynamically adapting, the code unit as an isolated computation directly by a privileged system executor object of the plurality of executor objects when the code unit is allowed by the plurality of executor objects in accordance with a current runtime state of the environment,
wherein each of the plurality of aspects refer to a feature or element of a program executing in the environment that is a cross-cutting concern or a core concern.

11. The computer program product of claim 10, wherein the isolated computation performs one of registration, security policy imposition, and logging policy imposition.

12. A computer program product encoded in one or more non-transitory machine-readable media, the computer program product comprising instructions to:
assemble a delegation chain of a plurality of executor objects for serially adapting a code unit to an environment comprising a plurality of aspects, at runtime,
  wherein the plurality of executor objects is capable of rejecting the code unit based on one or more of the plurality of executor objects,
  wherein the plurality of executor objects is capable of customizing the code unit, and
  wherein the environment hosts asynchronous concurrent tasks;
dynamically adapt, after assembling, the code unit to the environment using the delegation chain to serially delegate execution of the code unit, by:
  submitting, by each executor object of the plurality of executor objects and based on one of the plurality of aspects implemented by each executor object, the code unit to a next executor object of the delegation chain; and
execute, after dynamically adapting, the code unit as an isolated computation directly by a privileged system executor object of the plurality of executor objects when the code unit is allowed by the plurality of executor objects in accordance with a current runtime state of the environment, wherein each of the plurality of aspects refer to a feature or element of a program executing in the environment that is a cross-cutting concern or a core concern.

13. The computer program product of claim 12, wherein the delegation chain comprises a first sequence of instructions being executable to maintain a data structure that indicates the delegation chain.

14. The computer program product of claim 13, wherein maintaining the data structure comprises adding an indication of an executor object to the data structure when the unit of code is submitted to the executor object and removing the indication of the executor object if the executor object rejects the unit of code.

15. The computer program product of claim 14 further comprising a second sequence of instructions executable to indicate the unit of code as rejected if the data structure is empty after an executor object indication is removed.

16. An apparatus comprising:
a set of one or more processing units configured for:
assembling a delegation chain of a plurality of executor objects for serially adapting a code unit to an environment comprising a plurality of aspects, at runtime, wherein the plurality of executor objects is capable of rejecting the code unit based on one or more of the plurality of executor objects, wherein the plurality of executor objects is capable of adapting the code unit, and wherein the environment hosts asynchronous concurrent tasks;

dynamically adapting the code unit to the environment, using the delegation chain of the plurality of executor objects to serially delegate execution of the code unit, by:

submitting, by each executor object of the plurality of executor objects and based on one of the plurality of aspects implemented by each executor object, the code unit to a next executor object of the delegation chain; and executing, after dynamically adapting, the code unit as an isolated computation directly by a privileged system executor object of the plurality of executor objects when the code unit is allowed by one or more of the plurality of executor objects in accordance with a current runtime state of the environment, wherein each of the plurality of aspects refer to a feature or element of a program executing in the environment that is a cross-cutting concern or a core concern.

* * * * *